US010387429B2

(12) United States Patent
Smith-Mickelson et al.

(10) Patent No.: US 10,387,429 B2
(45) Date of Patent: Aug. 20, 2019

(54) FAST AD-HOC FILTERING OF TIME SERIES ANALYTICS

(71) Applicant: Jive Software, Inc., Portland, OR (US)

(72) Inventors: Jared Smith-Mickelson, Los Gatos, CA (US); Lance Riedel, Menlo Park, CA (US)

(73) Assignee: JIVE SOFTWARE, INC., Portland, OR (US)

( * ) Notice: Subject to any disclaimer, the term of this patent is extended or adjusted under 35 U.S.C. 154(b) by 367 days.

(21) Appl. No.: 13/763,121

(22) Filed: Feb. 8, 2013

(65) Prior Publication Data
US 2014/0229470 A1    Aug. 14, 2014

(51) Int. Cl.
*G06F 16/2457* (2019.01)
*G06F 16/2458* (2019.01)

(52) U.S. Cl.
CPC .... *G06F 16/24578* (2019.01); *G06F 16/2465* (2019.01); *G06F 16/2477* (2019.01)

(58) Field of Classification Search
CPC .......... G06F 17/3053; G06F 17/30722; G06F 17/30477; G06F 17/30616; G06F 17/30315
USPC ................. 707/725, 740, 728, 706
See application file for complete search history.

(56) References Cited

U.S. PATENT DOCUMENTS

| | | | |
|---|---|---|---|
| 2006/0106792 A1* | 5/2006 | Patterson | 707/5 |
| 2009/0132521 A1* | 5/2009 | Walters | G06F 17/2785 |
| 2010/0241622 A1* | 9/2010 | Jin et al. | 707/719 |
| 2012/0246154 A1* | 9/2012 | Duan et al. | 707/728 |
| 2012/0310940 A1* | 12/2012 | Carmel et al. | 707/740 |
| 2013/0166547 A1* | 6/2013 | Pasumarthi | G06Q 10/06 707/728 |
| 2013/0311438 A1* | 11/2013 | Marquardt et al. | 707/706 |

OTHER PUBLICATIONS

Wikipedia.com, "Faceted Search," <http://en.wikipedia.org/wiki/Faceted_search>, 5 pages (accessed Jan. 9, 2013).
Wikipedia.com, "Google Trends," <http://en.wikipedia.org/wiki/Google_Trends>, 4 pages (accessed Jan. 21, 2013).
The Apache Software Foundation, "Apache Lucene Faceted Search User's Guide," <http://lucene.apache.org/core/4_0_0/facet/org/apache/lucene/facet/doc-files/userguide.html>, 17 pages (accessed Jan. 9, 2013).

* cited by examiner

*Primary Examiner* — James Trujillo
*Assistant Examiner* — John J Morris (57) ABSTRACT

Techniques and tools are described for producing time-series data using faceted search based on document creation time. For example, index information can be created from events (e.g., by adding meta-data and indexing the events as documents). In addition, index information can be created that maps document creation time to time ranges. Search queries can then be executed (e.g., comprising ad-hoc filters to filter on the meta-data), and search results can be faceted on the time ranges to produce time-series data. The time-series data can be graphed to display trends of activity (e.g., trends of events based on user activity).

16 Claims, 7 Drawing Sheets

FIRST SET OF POSTING LISTS (510)

STATUS UPDATE (EVENT TYPE) { 1, 3, 7, 8, 15, 25, 52, 61, 93, 99, 100, 117, 118, 125 }

JOHN (AUTHOR) { 1, 4, 8, 15, 61, 72, 93 }

SUSAN (AUTHOR) { 7, 43, 48, 52, 101 }

PHIL (AUTHOR) { 74, 117, 125 }

JASON (MANAGER) { 7, 43, 48, 52, 74, 101, 117, 125 }

TRAINING { 8 }

CLASS { 8, 52 }

DINNER { 93 }

...

SECOND SET OF POSTING LISTS (520)

TIME RANGE 1 { 1, 2, 3, 4, ... 17 }

TIME RANGE 2 { 18, 19, 20, 21, ... 45 }

TIME RANGE 3 { 46, 47, 48, 49, 50, ... 98 }

TIME RANGE 4 { 99, 100, 101, 102, ... 122 }

TIME RANGE 5 { 123, 124, 125, 126, ... 138 }

FAST AD-HOC FILTERING OF TIME SERIES ANALYTICS

BACKGROUND

Organizations produce large amounts of data and are continually looking for ways to analyze and interpret such data. For example, an organization may use analytics or business intelligence systems to report on various trends that are of interest to the organization.

Traditional business intelligence solutions provide ways to produce filtered reports. An example of a filtered report could be a report that charts documents authored by a specific individual. Traditional business intelligence solutions implement filtering by allocating a database column to each filterable field, such as a document author field. When using large datasets, which may be typical, generation of such filtering (which may be performed on an ad-hoc basis) can be costly in terms of computing resources, and may be too costly to perform on a real-time or near-real-time basis.

In order to improve performance, traditional business intelligence solutions use a number of aggregation and pre-computation techniques. For example, counts of specific filterable fields can be maintained on an ongoing basis, such as a count of document authors. However, such techniques used by traditional business intelligence solutions suffer from limitations, such as a restriction on the number of filterable fields (e.g., to only those pre-defined fields for which counts are maintained) or ranges of criteria. In addition, changing or modifying available filterable fields can be difficult and time-consuming.

Therefore, there exists ample opportunity for improvement in technologies related to analyzing and interpreting data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for producing time-series data using faceted search based on document creation time (referring to the time an event, from which the document was created, occurred). For example, one or more of the following techniques can be applied separately or in combination: index information can be created from events (e.g., by adding meta-data and indexing the events as documents), index information can be created for a plurality of time ranges for documents created within those time ranges, search queries can be executed (e.g., comprising ad-hoc filters to filter on the meta-data), search results can be faceted on the time ranges to produce time-series data, and time-series data can be graphed to display trends of activity (e.g., trends of events based on user activity).

For example, a method is provided for producing time-series data based, at least in part, on document creation time. The method comprises receiving a search query, executing the search query using a first set of posting lists to produce matching documents, performing search faceting on the matching documents using, at least in part, a second set of posting lists, the second set of posting lists storing index information for a plurality of time ranges, and returning time-series data. Performing the search faceting on the matching documents comprises, for each time range of a plurality of time ranges, generating a count of documents, of the matching documents, that are present in index information for the time range.

As another example, a search system can be provided for producing time-series data based, at least in part, on document creation time. The search system comprises a first set of posting lists storing index information for a set of documents generated from a plurality of events based on user activity, and a second set of posting lists storing index information for a plurality of time ranges indicating which documents were created within each of the plurality of time ranges. The search system is configured to perform operations comprising receiving a search query, executing the search query using the first set of posting lists to produce matching documents, performing search faceting on the matching documents using, at least in part, the second set of posting lists, and returning time-series data comprising counts of documents created within each time range. Performing the search faceting on the matching documents comprises, for each time range of the plurality of time ranges, generating a count of documents, of the matching documents, that are present in index information for the time range.

As another example, a method can be provided for producing time-series data based, at least in part, on document creation time. The method comprises creating a first set of posting lists comprising, for each of a plurality of events based on user activity, receiving the event, retrieving meta-data associated with the event, and storing the event and the meta-data as a document. The method further comprises indexing the documents for the plurality of events, as a set of documents, to create the first set of posting lists. The method further comprises creating a second set of posting lists comprising, for each of a plurality of time ranges, storing index information identifying which documents, of the set of documents, were created within the time range, and storing the first set of posting lists and the second set of posting lists for use during execution of search queries and search faceting to produce time-series data.

The foregoing and other objects, features, and advantages of the invention will become more apparent from the following detailed description, which proceeds with reference to the accompanying figures.

DETAILED DESCRIPTION

The following description is directed to techniques and solutions for producing time-series data using faceted search based on document creation time. For example, index information can be created from events (e.g., by adding meta-data and indexing the events as documents). In addition, index information can be created that maps document creation time to time ranges. Search queries can then be executed (e.g., comprising ad-hoc filters to filter on the meta-data), and search results can be faceted on the time ranges to produce time-series data. The time-series data can be graphed to display trends of activity (e.g., trends of events based on user activity).

In some implementations, events are treated as documents, and search faceting is leveraged over time ranges to generate time series data. Faceting of search results can be applied as a technique to efficiently compute counts of results across ranges of time (e.g., document or event creation time). For example, a search-based approach to analytics can be applied in which events are denormalized at creation or index time. Denormalizing the events refers to the process of adding meta-data to the events, which can then be saved as documents and indexed. By denormalizing the events, filtering can be performed at search time based on any of the meta-data that was used to denormalize the events. Using this technique, many meta-data fields (e.g., hundreds or more) can be added without degrading performance. Furthermore, additional meta-data fields can be added later through re-indexing. At query time, results (e.g., search results filtered by particular meta-data) can be faceted by time ranges (e.g., hourly, daily, etc.) based on event or document creation time. Using these techniques, searching (e.g., including ad-hoc filtering based on meta-data), faceting, and returning results can be performed in real-time or near-real-time (e.g., using only index information, and without having to retrieve original document information, create additional database tables, etc.).

For example, users of a system can create events (e.g., status updates, blog postings, articles, instant messages, etc.). Various types of meta-data can be added to the events (e.g., meta-data that is associated with the type of the event, that is associated with the user or the user's organization, and/or any other type of meta-data). For example, status update events can be supplemented with meta-data such as the user that authored the event, the user's manager, how long the user has been with the organization, etc. The events and associated meta-data can then be indexed as documents. For example, content of the event (e.g., a status update message) and associated meta-data can be indexed. Later searching can be performed for event content and/or meta-data. For example, at search time ad-hoc filters can be received to filter based on any of the meta-data information that was indexed with the event. Search faceting can then be performed over a set of time ranges to produce counts of matching documents that were created within each of the time ranges (e.g., counts of status update events that were created within each of the time range) as time-series data. The time-series data can then be returned (e.g., as a graph).

Indexing Events as Documents

In the techniques and solutions described herein, events can be indexed as documents. For example, events based on user activity can be generated within a computing system. As an example, a social networking system can be used by the users of an organization. When the users create events within the system, meta-data can be added to the events and the events can be saved as documents. Examples of events include status updates, instant messages, document creation, blog postings, discussion postings, adding comments to documents, sending messages, and any other type of event based on user activity within a computing system or computing environment.

Saved documents (e.g., comprising event information and associated meta-data) can be indexed. For example, posting lists (inverted indexes), and/or other index information, can be created from the documents. The posting lists can comprise mappings of event information and meta-data to document identifiers.

Indexing Documents using Time Ranges

In the techniques and solutions described herein, documents can be indexed using time ranges. Indexing documents using time ranges supports later search faceting using the time ranges. For example, posting lists can be created that comprise index information for a plurality of time ranges. The index information for a particular time range indicates which documents (or their corresponding events) were created during that time range.

The length of time represented by a time range can vary depending on implementation details. For example, time ranges can represent document creation on an hour-by-hour basis. Alternatively, another length of time can be used as a time range, such as a minute or a day. For example, if an hourly time basis is used, then a posting list can be created listing all documents created during a particular hour of a particular day. Another posting list can be created listing all documents created during the next hour of the particular day, and so on.

Executing Search Queries

In the techniques and solutions described herein, search queries can be executed using a set of posting lists to produce matching documents. The search queries can comprise filters to perform ad-hoc filtering of documents using indexed meta-data information associated with the documents.

For example, a set of posting lists can index documents, including status update documents. A search query can be executed comprising a filter to select all status update documents (all documents that were associated with meta-data indicating a status event document). Matching documents can be returned (e.g., document identifiers of the matching documents can be returned).

Because the set of posting lists can store index information for both document content (e.g., status update messages, blog posting content, message content, etc.) and meta-data, search queries can include search criteria for terms contained within document content, meta-data information, and combinations. For example, ad-hoc filtering can be performed at search time, which allows the searcher to select the filter criteria using various types of meta-data (e.g., based on event type, such as status update events, based on the author of the event, etc.). Such ad-hoc filtering provides flexibility at search time as the searcher can filter on any of the meta-data (e.g., any of the meta-data fields) that has been indexed with the documents.

Server Environment

In the techniques and solutions described herein, a server environment (computing environment) can be provided that supports the faceted search related techniques and solutions described herein. For example, the server environment can receive events (e.g., based on user activity within the server environment), add meta-data to the events, save the events as documents, and index the documents. The server environment can also monitor document creation time (which can correspond to event creation time) and create index information indicating which documents were created for a plurality of time ranges. The server environment can also receive search queries from users (e.g., comprising filters on meta-data), return matching documents, perform search faceting on the results over the time ranges, and return time-series data (e.g., in the form of numerical results or a visual representation, such as a graph).

Figure 1:
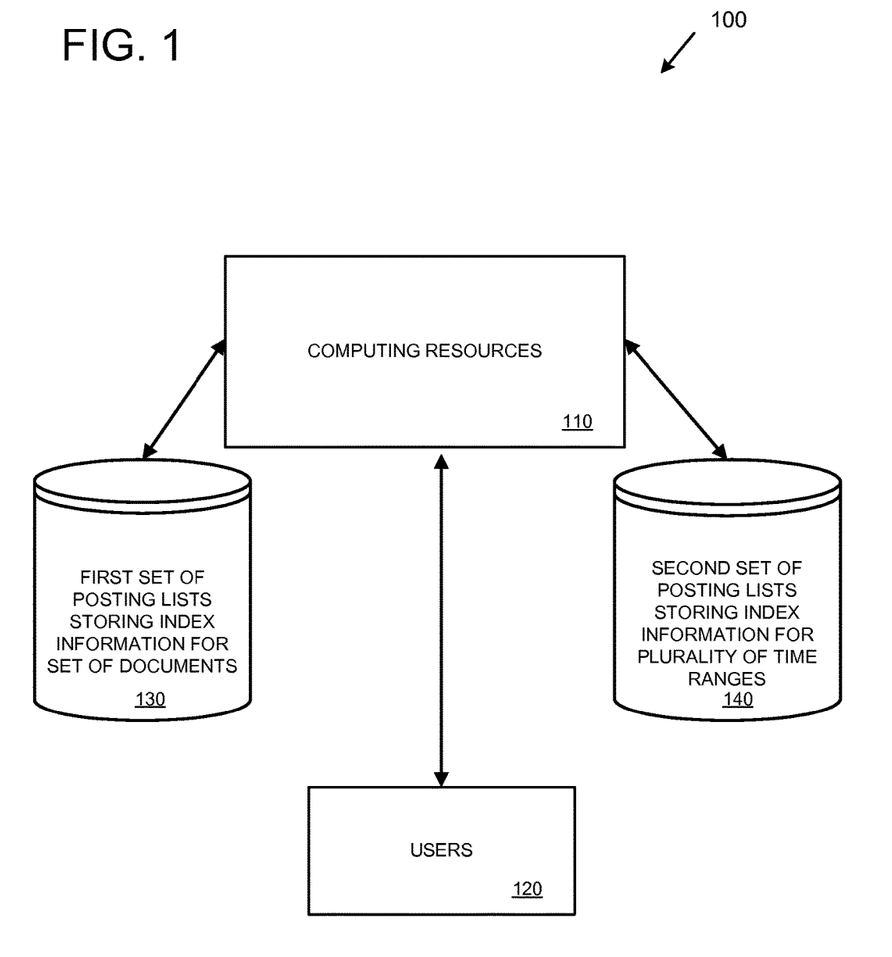
FIG. 1 is a diagram depicting an example server environment supporting faceted search related techniques and solutions.

FIG. 1 is a diagram depicting an example server environment 100 supporting the faceted search related techniques and solutions described herein. The server environment 100 can comprise various types of computing resources 110, such as server computers, database servers, application servers, index servers, networking resources, etc. The server environment 100 can be implemented, for example, as part of a distributed system, a client-server system, and/or a cloud computing environment.

The server environment 100 provides computing services to users 120 via the computing resources 110. For example, the server environment 100 can provide applications, such as social networking applications and/or other types of computing services, to the users 120. The users 120 can access the computing resources 110 using a variety of client computing devices, such as desktop computers, notebook computers, tablets, smart phones, and other types of computing devices.

The server environment 100 supports monitoring or receiving events performed within the server environment 100 based on activity of the users 120. For example, the computing resources 110 (e.g., an application server) can receive a request from one of the users 120 to update the user's status (a "status update" event). In response, the computing resources 110 can perform a number of activities. One of the activities that the computing resources 110 can perform is to retrieve meta-data associated with the event and add the meta-data to the event to create a document. For example, the meta-data can comprise information that is relevant to the event and/or that may be useful later for filtering when performing a search. The computing resources 110 can then index the document, along with other documents created from other events and their associated meta-data, to create a first set of posting lists. The computing resources 110 can store the first set of posting lists in a data store 130.

Another activity that the computing resources 110 can perform is to create index information indicating when the event, or document, was created. For example, the computing resources can maintain a list of all events, or documents, created within a current time range (e.g., a current minute, hour, day, or other time period). When the current time period has ended, the computing resources 110 can create a posting list indicating which events, or documents, were created during that current time period. The computing resources 110 can also create the posting list on an ongoing basis (e.g., in real-time or near-real-time as the events and/or documents are created). The computing resources 110 store the posting list, along with posting lists for other time ranges, in a data store 140.

The computing resources 110 can perform a number of activities using the first set of posting lists 130 and/or the second set of posting lists 140. One of the activities that the computing resources 110 can perform is to receive search queries (e.g., from the users 120, via an automated process, etc.). The search queries can comprise search terms and/or ad-hoc filters. The computing resources 110 can execute the search queries using the first set of posting lists 130, and return documents (e.g., by document identifier) that match the search queries (e.g., documents that contain the search terms and that match the ad-hoc filters). For example, one of the users 120 could perform a search for all documents of type "status update" (e.g., all documents that are associated with meta-data indicating a "status update" event type) and that contain a particular word in the status update description.

Another activity that the computing resources 110 can perform is search faceting on search results. For example, the computing resources 110 can receive a list of documents matching a search query (e.g., a list of document identifiers). The computing resources 110 can then generate a count of documents (from the list of matching documents) that were generated within each of a plurality of time ranges using the second set of posting lists 140. For example, a search query for all "status update" documents could return a list of 45 document identifiers. The list of 45 document identifiers can then be compared to posting lists (from 140) to generate counts of documents that were created within each of a plurality of time ranges (e.g., 5 documents may have been created during a first time range, 8 documents may have been created within a second time range, and so on).

Another activity that the computing resources 110 can perform is to return time-series data. The time-series data represents results of the search faceting, which are the counts of documents created within various time ranges. For example, the time-series data can be returned as numerical counts of documents created within each time range. The time-series data can also be returned as a graph depicting the counts versus time.

Methods for Producing Time-Series Data

In the techniques and solutions described herein, methods can be provided for producing time-series data based, at least in part, on document creation time. For example, events based on user activity within a system can be augmented with meta-data and indexed as documents and also indexed by creation time (e.g., a faceted index based on event time). Time-series data can be produced by faceting on time ranges using search results.

Figure 2:
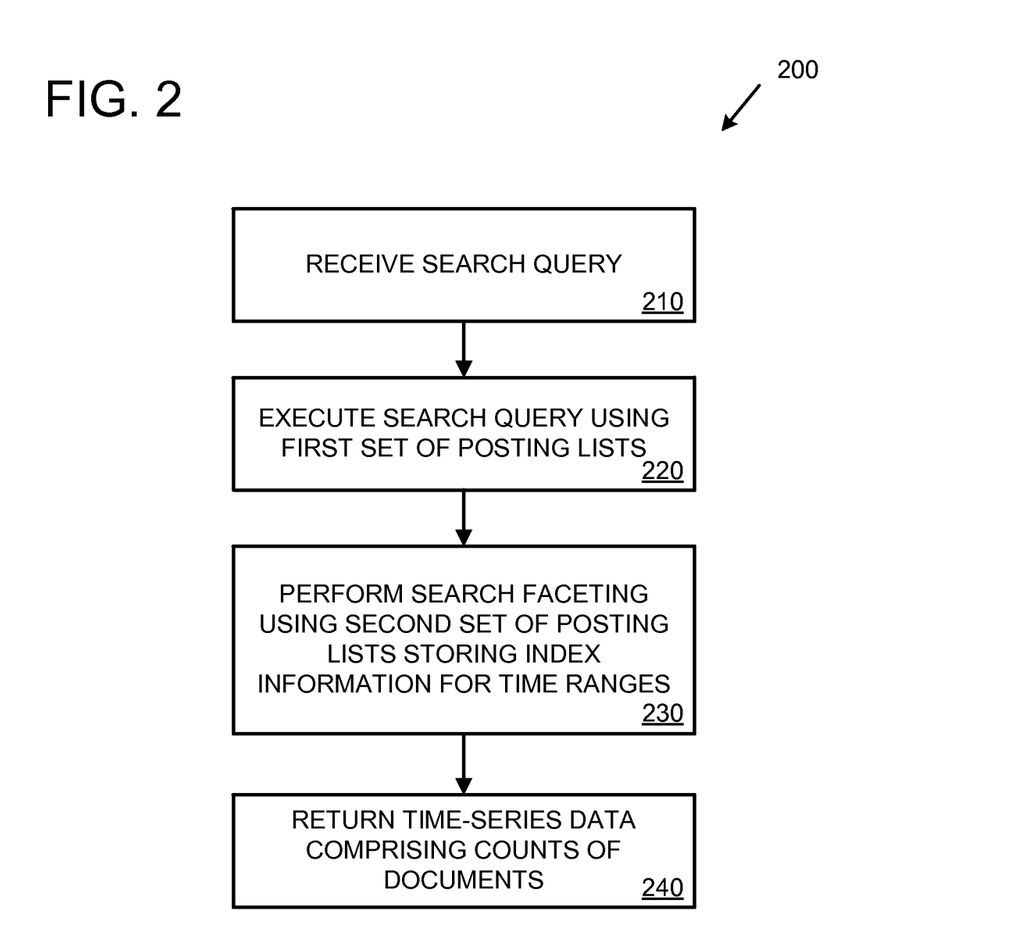
FIG. 2 is a diagram depicting an example flowchart for producing time-series data based, at least in part, on document creation time.

FIG. 2 is a flowchart showing an exemplary method 200 for producing time-series data based, at least in part, on document creation time. At 210, a search query is received. For example, the search query can comprise one or more terms and/or one or more ad-hoc filters. The ad-hoc filters can be used to filter documents based on meta-data.

At 220, the received search query is executed using a first set of posting lists to produce matching documents. The first set of posting lists store index information for a set of documents (e.g., posting lists for terms and/or meta-data for the set of documents), including the matching documents.

At 230, search faceting is performed on the matching documents using, at least in part, a second set of posting lists. The second set of posting lists store index information for a plurality of time ranges. For example, the second set of posting lists can comprise an ordered list of document identifiers associated with each time range (e.g., each posting list can represent a different time range). Performing the search faceting 230 comprises generating a count of documents, of the matching document, for each of the plurality of time ranges represented in the second set of posting lists.

At 240, time-series data comprising counts of documents is returned. The time-series data can be returned, for example, as a numerical list of counts or as a graphical representation of the time-series data results. For example, a graph of counts versus time can be returned.

Figure 3:
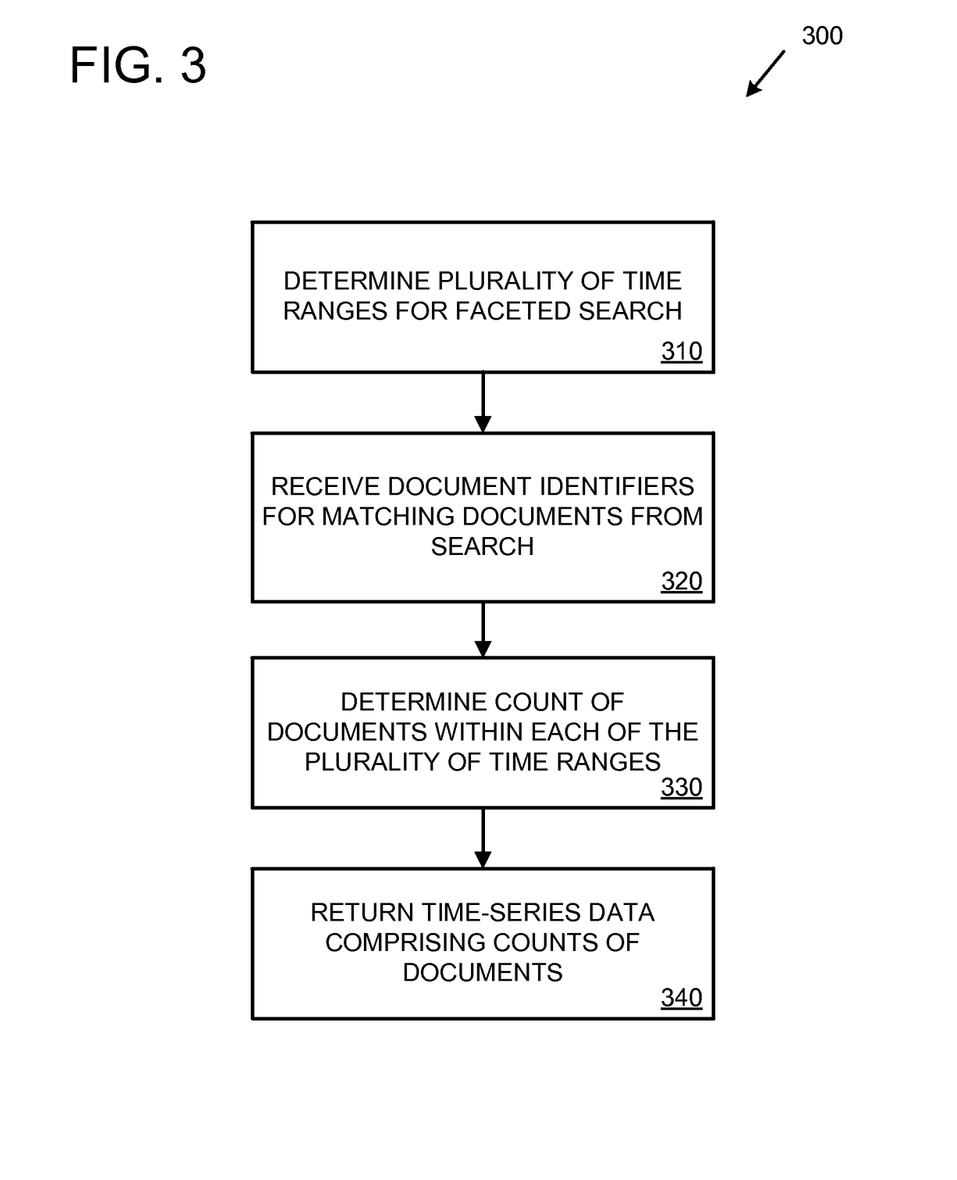
FIG. 3 is a diagram depicting an example flowchart for performing search faceting on time ranges.

FIG. 3 is a flowchart showing an exemplary method 300 for performing search faceting on time ranges. At 310, a plurality of time ranges for faceted search are determined. For example, the plurality of time ranges can be determined based on time ranges stored in a set of posting lists. The plurality of time ranges can be selected by a user or determined automatically. For example, a user could select faceting at hourly increments for a particular week, month, or year.

In some implementations, the posting list stores time ranges in a particular increment (e.g., a separate posting list for each hour). Storing time ranges in a particular increment supports search faceting at a level of granularity of the particular increment (e.g., hourly) or greater (e.g., daily, weekly, etc.). For example, counts from hourly posting lists can be aggregated to produce daily, weekly, or monthly counts as needed. In other implementations, the posting list stores time ranges in a number of different increments (e.g., posting lists for each hour and posting lists for each day).

At 320, document identifiers are received for matching documents from a search. For example, a user can perform a search based on particular terms and/or filter criteria (to filter based on meta-data). The document identifiers of the documents returned by the search can then be received.

At 330, a count of documents within each of the plurality of time ranges is determined. The count can be determined by matching document identifiers from the search results to document identifiers in the posting lists for each time range. By matching document identifiers using index information, search faceting over time ranges to generate time-series data can be performed efficiently even for very large datasets.

At 340, time-series data comprising the counts of documents is returned. The time-series data can be returned in the form of a graph of counts versus time.

Figure 4:
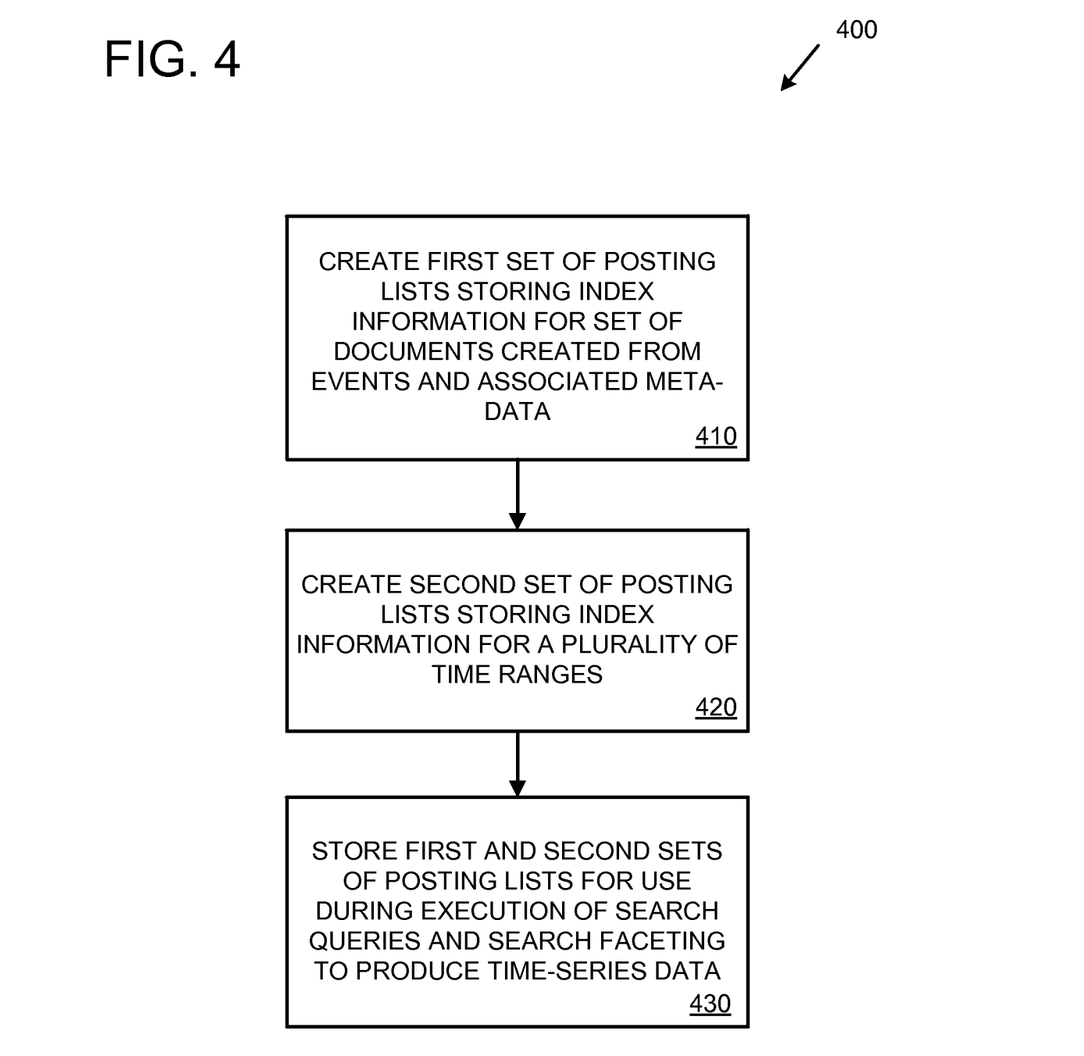
FIG. 4 is a diagram depicting an example flowchart for creating posting lists for use during search faceting on time ranges.

FIG. 4 is a flowchart showing an exemplary method 400 for creating posting lists for use during search faceting on time ranges. At 410, a first set of posting lists is created. The first set of posting lists stores index information for a set of documents, which are created from events (e.g., events based on user activity) and associated meta-data.

At 420, a second set of posting lists is created. The second set of posting lists stores index information for a plurality of time ranges. The index information maps documents (using their document identifiers) to the time ranges within which the documents were created.

At 430, the first and second sets of posting lists are stored for use during execution of search queries (e.g., comprising ad-hoc filters) and search faceting to produce time-series data. For example, the first set of posting lists can be used when executing a search query (e.g., including ad-hoc filtering) to produce matching documents. The second set of posting lists can be used to perform search faceting on the time ranges to return counts of documents (from the search results) that were created during each of the time ranges.

Example Implementation

Figure 5:
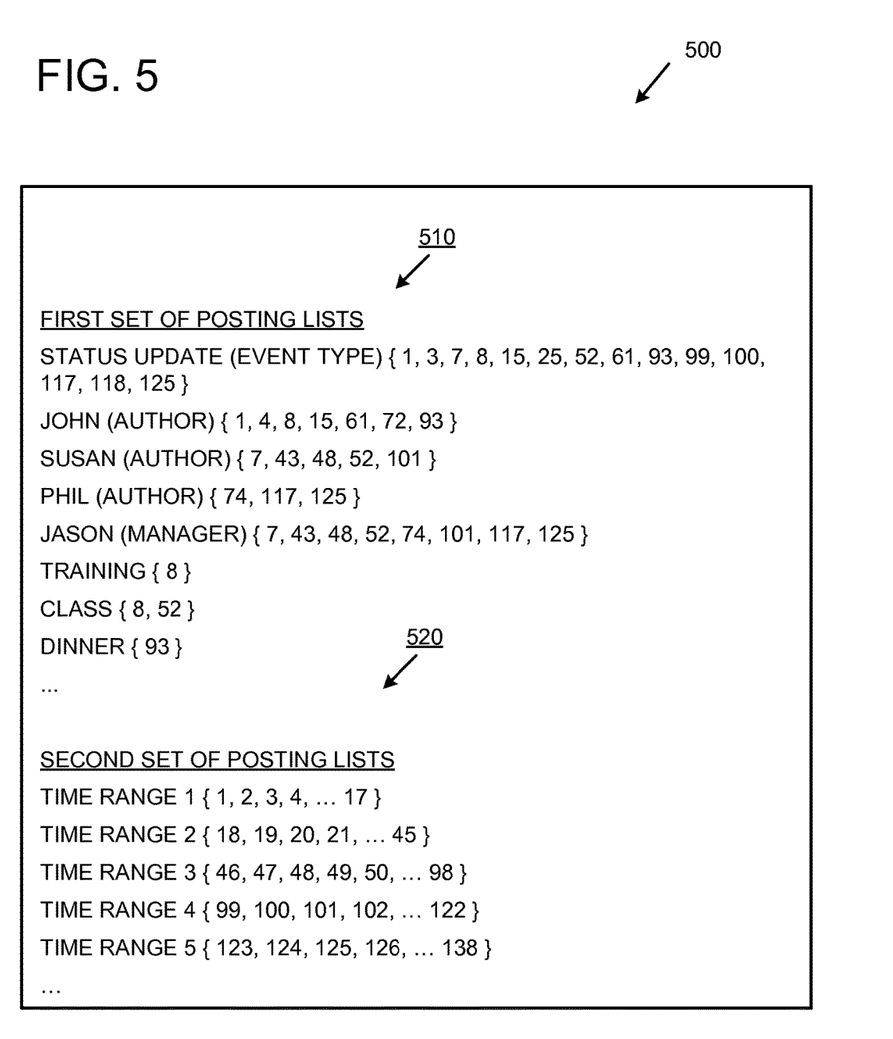
FIG. 5 is a diagram depicting example posting lists for use during searching and faceting on time ranges.

FIG. 5 is a diagram depicting example posting lists 500 that can be created and used when searching and when faceting on time ranges to produce time-series data. The example posting lists 500 reflect events based on user activity within a system, such as the server environment depicted in FIG. 1. In the example posting lists 500, documents are created from events and are assigned document identifiers starting from document identifier 1. The example posting lists 500 only depict posting list information for a subset of documents, specifically for a number of status update events.

A first set of posting lists is depicted at 510. The first set of posting lists 510 are created from status update events. For example, a server environment can receive status update events from users, retrieve meta-data associated with the users and/or events to create documents, and index the documents to create the first set of posting lists 510. As depicted in the first set of posting lists 510, a number of status update event documents have been indexed (document identifiers 1, 3, 7, 8, 15, . . . 125). In addition, the first set of posting lists 510 depicts index information for meta-data associated with the documents. In particular, author and manager meta-data has been indexed. Also, the first set of posting lists 510 depicts index information for terms present in the document (in this example, the content of the status update event).

One of the example status update events depicted in the example posting lists 500 is a status update created by user John. Specifically, user John has changed his status (a status update event) to, "Teaching a training class today." In response, the system has added meta-data to the event (that John is the author) and indexed the event as a document. The system has also indexed terms in the status update message, specifically the terms "training" and "class." This status update event document corresponds to document identifier 8 in the first set of posting lists 510. Other example status update information is also depicted in the example posting lists 500. For example, meta-data for a manager (Jason), who is the manager for user Susan and user Phil, has been associated with status update events by Susan and Phil and added to the index.

A second set of posting lists is depicted at 520. The second set of posting lists 520 store index information for a plurality of time ranges. Each of the posting lists depicted at 520 indicates which documents (by document identifier) were created within that time range. For example, "time range 1" can represent a particular hour of a particular day (e.g., 8-9 a.m. on Jan. 1, 2013), "time range 2" can represent the next hour (e.g., 9-10 a.m. on Jan. 1, 2013), and so on. As depicted in the set of posting lists 520, documents with document identifiers 1 through 17 were created during time range 2, documents with document identifiers 18 through 45 were created during time range 3, and so on. For example, the status update event associated with document identifier 8 (John's "Teaching a training class today" status update) was created during time range 1 (e.g., John changed his status between 8-9 a.m. on Jan. 1, 2013).

Search queries can be executed using the first set of posting lists 510 and the second set of posting lists 520. For example, an example search query can be received for all status update events (e.g., meta-data event type is "status update") that were authored by user John (e.g., meta-data author is "John"). Using the example first set of posting lists 510, this example search query would return document identifiers for status update documents that have user John as the author (i.e., matching document identifiers between the status update (event type) posting list and the John (author) posting list). In this case, only document identifiers 1, 8, 15, and 61 would be returned. Non-matching document identifiers would not be returned (e.g., John is also associated as an author with document identifiers 4, 72, and 93, but these are not status update events because they are not in the status update posting list).

Search faceting can also be performed using the first set of posting lists 510 and the second set of posting lists 520. For example, using the matching documents from the above example search query (document identifiers 1, 8, 16, and 61), search faceting can be performed by matching the returned document identifiers to the time range posting lists of the second set of posting lists 520. The result of the search faceting for this particular example would be a count of two documents in time range 1 (document identifiers 1, 8, and 16), zero documents in time range 2, one document in time range 3 (document identifier 61), and zero documents in time ranges 4 and 5.

As illustrated by the above examples, executing searches (e.g., using ad-hoc meta-data filters and/or search terms) and faceting over time ranges can be quickly and efficiently performed using posting lists (e.g., posting lists depicted at 500) by comparing document identifiers. In this manner, searching (including ad-hoc filtering), faceting on time ranges, and producing time-series data (e.g., graphs of counts indicating trends of activity) can be performed in real-time or near-real-time (e.g., in seconds or less) even with very large datasets.

Figure 6:
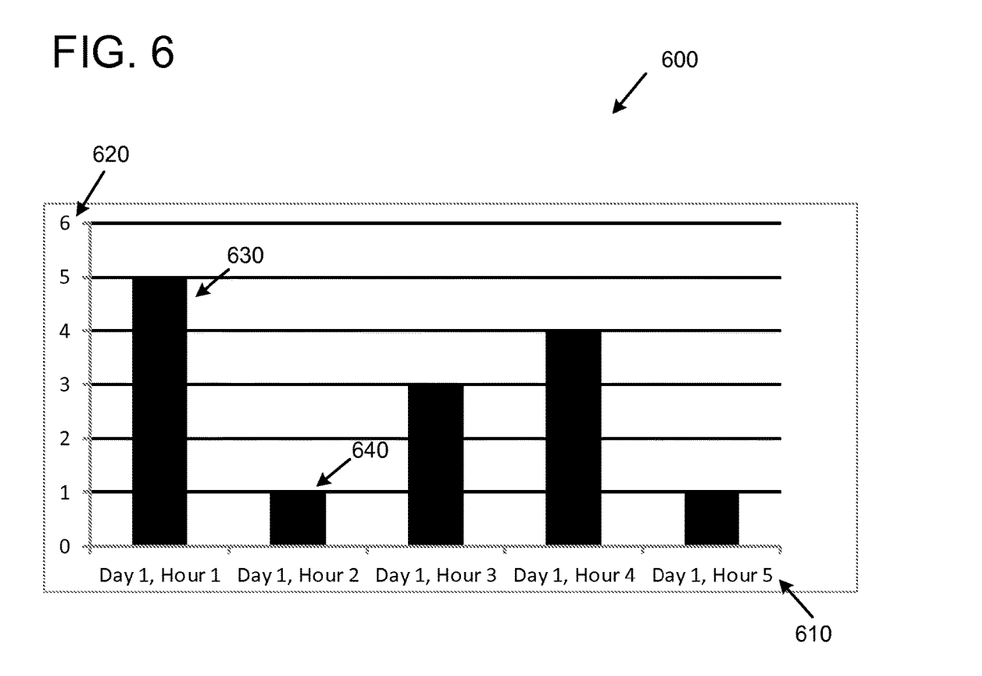
FIG. 6 is a diagram depicting an example chart depicting faceted search results including time-series data.

FIG. 6 is a diagram depicting an example chart 600 of faceted search results of time-series data. The example chart 600 depicts a number of time ranges on the x-axis 610. The time ranges correspond to time ranges 1 through 5 depicted in the example second set of posting lists 520, where time range 1 is "day 1, hour 1," time range 2 is "day 1, hour 2," and so on. The example chart 600 depicts counts of documents along the y-axis 620. The counts of documents reflect execution of a search query for all status update events using the first set of posting lists 510 faceted on the time ranges in the second set of posting lists 520. Specifically, there are five documents 630 in the first time range (day 1 hour 1), one document 640 in the second time range (day 1 hour 2), and so on.

Example Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 7:
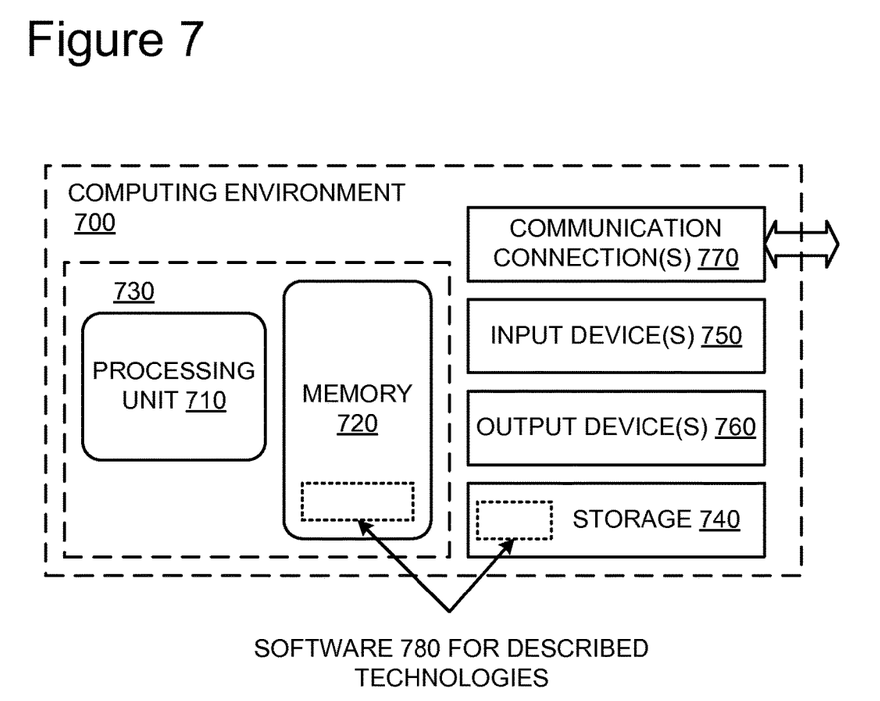
FIG. 7 is a block diagram illustrating an example computing device in conjunction with which techniques and tools described herein may be implemented.

FIG. 7 illustrates a generalized example of a suitable computing environment 700 in which described embodiments, techniques, and technologies may be implemented. The computing environment 700 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and/or storage 740. The term computer-readable storage media does not include communication connections (e.g., 770) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

We claim:

1. A method, implemented at least in part by a computing device, for producing time-series data based, at least in part, on document creation time, the method comprising:

creating, by the computing device, a first set of posting lists storing index information for a set of documents that, wherein (i) creating the first set of posting lists comprises denormalizing events linked to user activity within a computing system by retrieving and adding meta-data to the events, indexing the events as the set of documents, and indexing the set of documents and (ii) the first set of posting lists comprises index information mapping meta-data and documents associated with the meta-data;

creating, by the computing device, a second set of posting lists, the second set of posting lists storing index information for a plurality of time ranges, wherein each posting list in the second set comprises a separate, inverted index comprising document identifiers of documents of the set of documents that were created within a time range, of the plurality of time ranges, associated with the posting list;

receiving a search query;

executing, by the computing device, the search query using the first set of posting lists to produce matching documents, wherein executing the search query comprises filtering the set of documents using one or more ad-hoc filters and the first set of posting lists;

performing, by the computing device, search faceting on the matching documents using, at least in part, the second set of posting lists, wherein the performing search faceting on the matching documents comprises:

identifying posting lists in the second set of posting lists that are associated with the plurality of time ranges, and generating document counts for the plurality of time ranges, wherein generating a document count for a time range comprises comparing document identifiers of the matching documents in the first set of posting lists to document identifiers present in the inverted index of the identified posting list in the second set of posting lists for the time range to identify matching documents with document identifiers in the inverted index of the identified posting list; and returning, by the computing device, time-series data comprising the document counts for the plurality of time ranges.

2. The method of claim 1, wherein the set of documents are generated from events based on user activity within a computing environment.

3. The method of claim 1, wherein the set of documents are generated from events based on user activity within a computing environment by receiving events, associating meta-data with the events to create the set of documents, and indexing the set of documents to generate the first set of posting lists.

4. The method of claim 1, wherein returning the faceted search results comprises:

generating a graphical representation of the time-series data comprising a graph depicting each of the plurality of time ranges versus counts of matching documents associated with each of the plurality of time ranges.

5. The method of claim 1, wherein executing the search query returns a list of document identifiers identifying the matching documents.

6. The method of claim 1, wherein executing the search query, performing the search faceting, and returning the time-series data are performed in near-real-time using the first set of posting lists and the second set of posting lists.

7. The method of claim 2, wherein the each set of posting lists are updated as events are created.

8. The method of claim 4, wherein the graph comprises two dimensions, wherein the plurality of time ranges are represented in a first dimension and the counts of the matching documents are represented in a second dimension.

9. A search system for producing time-series data based, at least in part, on document creation time, the search system comprising:
- a first set of posting lists, the first set of posting lists storing index information for a set of documents, wherein the set of documents are generated from a plurality of events based on user activity within a computing environment; and
- a second set of posting lists, the second set of posting lists storing index information for a plurality of time ranges, wherein each posting list in the second set comprises a separate inverted index storing document identifiers of documents of the set of documents that were created within a time range, of the plurality of time ranges, associated with the posting list;
- wherein the search system is configured to create the first set of posting lists comprising:
  - for each of the plurality of events based on user activity within a computing system:
    - receiving the event;
    - retrieving meta-data associated with the event;
    - denormalizing each event linked to user activity by adding the meta-data to each event
    - generating one or more ad-hoc filters based on the meta-data; and
    - storing the event and the meta-data as a document, wherein the document is one of the set of documents; and
    - indexing the set of documents to create the first set of posting lists;
- wherein the search system is configured to create the second set of posting lists; and
- wherein the search system is configured to perform operations comprising:
  - receiving a search query;
  - executing the search query using the first set of posting lists to produce matching documents;
  - performing search faceting on the matching documents using, at least in part, the second set of posting lists, wherein the performing search faceting on the matching documents comprises:
    - generating matching document counts for each time range of the plurality of time ranges, wherein generating a matching document count for a time range comprises:
      - identifying a posting list in the second set of posting lists associated with the time range; and
      - generating a count of documents, of the matching documents in the first set of posting lists, that are present in the inverted index of the identified posting list for the time range, wherein generating the count of documents is performed by comparing document identifiers of the matching documents in the first set of posting lists to document identifiers present in the inverted index of the identified posting list for the time range; and
    - returning time-series data comprising the matching document counts for each of the plurality of time ranges.

10. The search system of claim 9, wherein the search query comprises the one or more ad-hoc filters, and wherein executing the search query comprises filtering the set of documents using the one or more ad-hoc filters and the first set of posting lists.

11. The search system of claim 9, wherein returning the faceted search results comprises:
- generating a graphical representation of the time-series data comprising a graph depicting each of the plurality of time ranges versus counts of matching documents associated with each of the plurality of time ranges.

12. The search system of claim 9, wherein executing the search query returns a list of document identifiers identifying the matching documents.

13. The search system of claim 9, wherein executing the search query, performing the search faceting, and returning the time-series data are performed in near-real-time using the first set of posting lists and the second set of posting lists.

14. The search system of claim 9, wherein the each set of posting lists are updated as events are created.

15. A non-transitory computer-readable storage medium storing computer-executable instructions for causing a computing device to perform a method for producing time-series data based, at least in part, on document creation time, the method comprising:
- creating a first set of posting lists, comprising:
  - for each of a plurality of events based on user activity within a computing environment:
    - receiving the event;
    - retrieving meta-data associated with the event;
    - denormalizing each event linked to user activity by adding the meta-data to each event;
    - generating one or more ad-hoc filters from the meta-data; and
    - creating a document for the event and the meta-data and storing the document; and
  - indexing the created documents for the plurality of events, as a set of documents, to create the first set of posting lists;
- creating a second set of posting lists, comprising:
  - for each of a plurality of time ranges, creating a posting list associated with the time range that identifies which documents, of the set of documents, were created within the time range associated with the posting list, wherein the second set of posting lists comprises a separate inverted index for each time range of the plurality of time ranges storing document identifiers of those documents created during the time range;
- storing the first set of posting lists and the second set of posting lists for use during execution of search queries and search faceting to produce time-series data;
- receiving a search query, the search query comprising the one or more ad-hoc filters;
- executing the search query using the first set of posting lists to produce matching documents from the set of documents;
- generating counts of documents, of the matching documents, in each time range of the plurality of time ranges, wherein generating a count of documents in a time range comprises comparing document identifiers of the matching documents to document identifiers present in an inverted index of a posting list, of the second set of posting lists, for the time range; and
- returning time-series data comprising the counts of documents for each time range.

16. The computer-readable storage medium of claim 15, the method further comprising:

generating a graphical representation of the time-series data comprising a graph depicting each of the plurality of time ranges versus counts of matching documents associated with each of the plurality of time ranges.

* * * * *